April 20, 1965  S. Z. LEWIN ETAL  3,179,581

ELECTROCHEMICAL DOSIMETER

Filed Feb. 1, 1961

INVENTORS
SEYMOUR Z. LEWIN
RALF KOSLOW
BY

3,179,581
ELECTROCHEMICAL DOSIMETER

Seymour Z. Lewin, Bayside, and Ralf H. Koslow, New York, N.Y., assignors to the United States of America as represented by the United States Atomic Energy Commission
Filed Feb. 1, 1961, Ser. No. 86,561
1 Claim. (Cl. 204—195)

This invention relates to an electrochemical dosimeter and more particularly to an electrochemical dosimeter which relies upon the electrochemical effect produced as a result of irradiation on a chemical solution to measure the rate and intensity of such irradiation.

Dosimeters are used essentially to measure either the presence of irradiation in a given area or to measure the amount of irradiation imposed upon an object under certain conditions. Briefly stated, dosimeters are used to detect and measure irradiations. Through the years, many types of dosimeters have been devised. Among them have been the Geiger-Mueller counter, ionization chambers, and the colorimetric dosimeter. The colorimetric dosimeter is classified as a chemical dosimeter. To more fully understand the present invention, which relates to an electrochemical dosimeter, a brief discussion of a chemical dosimeter is in order.

Great interest in chemical methods of dosimetry came with the advent of nuclear reactors, atomic weapons, the experimental use of increasingly intense radiation sources such as the betatron, telecobalt, and Van de Graaff X-ray generators, and the recent emphasis in radiobiological research on the chemical changes produced in cells and tissue fluids by ionizing radiations. It is to be understood that the chemical dosimeter to be disclosed, and those to be discussed herein, relate to liquid systems although there are in existence gas and solid chemical systems, used in dosimeters. The liquid chemical system has been used to date mostly in colorimeter dosimeters. The radiation-induced reaction products of the liquid chemical systems of colorimeters can be measured directly by color changes, or indirectly by simple analytical procedures. A colorimeter is, therefore, a chemical system which upon irradiation will change colors depending upon the amount of irradiation received.

One of the earliest types of chemical dosimeters was one which changed color on exposure to relatively soft X-rays. Pastilles containing barium platinocyanide after irradiation changed from a normal green color to orange, and then to various shades of brown. The main difficulty encountered with pastilles was that the color reverted to its original green on exposure to light. Furthermore, the color standards of a comparison chart used to indicate the amount of irradiation received by the colorimeter also faded with time and thus rendered the colorimeter readings inaccurate. Present day colorimeters using comparison charts are also subject to this limitation. Other colorimeters using chloroform, iodine and ferrous-ferric systems have also been investigated and used. The ferrous-ferric system is presently accepted by numerous workers as the best method for measuring X- and γ-rays in kilo-roentgen doses at dose rates up to 1000 r./min. Still other methods using sodium benzoate or benzene, and a ceric-cerrous system, have been investigated. However, no dosimeter to date has been found to be sufficiently sensitive to register γ-radiations in the lower part of the dose range (0–1000 r.).

Therefore, an object of this invention is a chemical dosimeter which is highly sensitive.

Another object of this invention is a chemical dosimeter which is highly accurate.

Another object of this invention is a chemical dosimeter which will have a long life.

A further object of this invention is a chemical dosimeter containing a stable solution.

A still further object of this invention is a dosimeter which can be used in measuring total irradiation dosages.

Further objects of this invention may be ascertained by referring to the accompanying drawings and following description.

It has been discovered that by using the electrochemical effect which occurs in a liquid chemical solution upon irradiation, measurements and detection of irradiation can be achieved and that by adjusting the potential applied to the said liquid chemical solution, the chemical solution may be regenerated after or during irradiation to offset the effect of radiation.

The electrochemical principle, which is of importance in understanding the present invention, is the principle involved in the operation of primary electrolytic cell.

In such a cell an E.M.F. can be obtained as a result of depolarization of an electrode. A primary electrolytic cell depends upon the loss of an electron at one of the electrodes which are inserted into the cell; this cell is divided into two half cells by a membrane and an electrode of suitable metal is placed in each half cell with a wire conductor joining them. The electrode which receives the electrons is the cell's anode. One of the chemical systems, as set forth above, used in colorimeter dosimeters is a ferrous-ferric system. It is known in the art that the oxidation of ferrous to ferric occurs in a linear relation to the amount of irradiation received by the system. As the present invention relates to the use of such a solution in a preferred embodiment thereof, it will be used to illustrate the operation of a primary electrolytic cell.

If one half cell of a primary cell contains a ferrous sulfate solution, oxidation of the ferrous ion to ferric will normally take place. The reaction which takes place may be set forth as:

$$Fe^{++} - 1e \longrightarrow Fe^{+++} \tag{1}$$
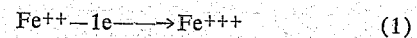

The electron given up by the ferrous ion creates a slight E.M.F. The flow of electrons is through a conductor attached to the anode placed in the cell rather than through the solution as the primary cell solutions are divided into two halves by a membrane as set forth above. This membrane delays the intermixing and combination of the ions in the solutions of the half cells.

The second half cell usually contains an $H^+$ solution and the electrode plate placed therein is polarized with a large quantity of $O_2$ upon its surface. When the electron flow reaches this electrode plate (the cathode) a reduction takes place which can be expressed by:

$$O_2 + 4H^+ + 4e \longrightarrow 2H_2O \tag{2}$$
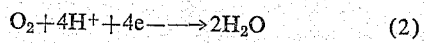

It is readily seen that the cathode is being depolarized continuously. The flow of electrons in the primary cell thus establishes an E.M.F. The depolarization at the cathode will continue until the cathode electrode is completely depolarized at which time no further current will be detectable.

Figure 1:
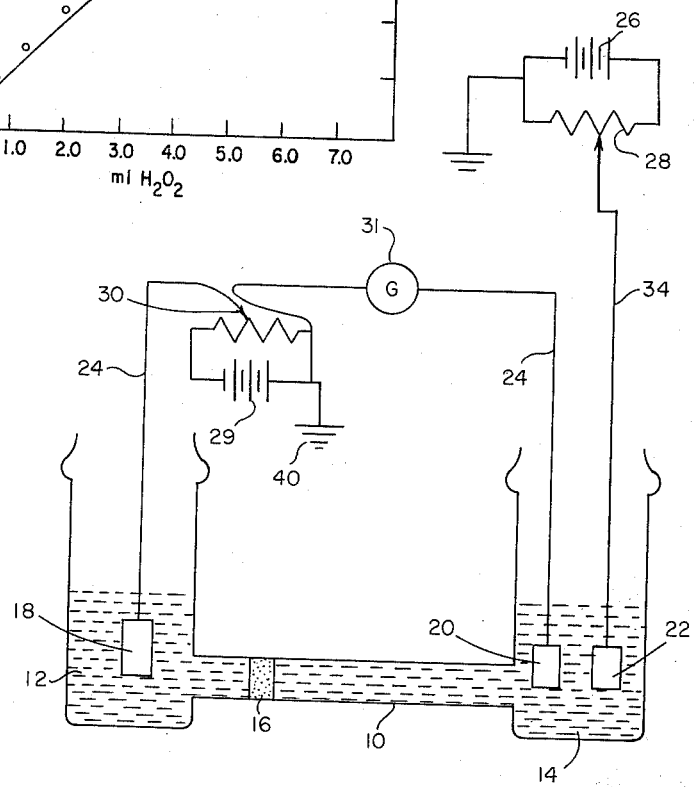
FIGURE 1 is a diagram of a preferred embodiment of this invention.

Having thus discussed the fundamental principles relating to the present invention, the preferred embodiment of the electrochemical dosimeter discovered by the inventors is illustrated in FIGURE 1.

Cell 10 has two electrode containing regions 12 and 14, separated by a porous frit 16. The electrolytic region 12 contains electrode plate 18, which is connected by means of conductor 24 to the wiper of a potentiometer 30. Potentiometer 30 is connected across battery 29 which is grounded at ground 40. Electrode plate 20 in region 14 is connected to conductor 24 and meter 31 is inserted in conductor 24 to measure current flow. Electrode 20 is made of precleaned platinum.

Electrode 22, which is of similar construction as electrode 20, is immersed also in region 14. Electrode 22 is connected by means of conductor 34 to the wiper of a potentiometer 28. Potentiometer 28 is connected across battery 26 which is grounded at its negative pole.

The electrolytic cell 10 which is a primary electrolytic cell, is separated into the described regions 12 and 14 by the frit 16 which, in this case, is a fine porosity sintered glass disc. Region 12 of the cell 10 is a ferrous sulfate solution in sulfuric acid, $10^{-3}$ molar ferrous sulfate in 0.8 N sulfuric acid. Region 14 of cell 10 is 0.8 N sulfuric acid or other electrolytic solution, such as $Na_2SO_4$, $H_3PO_4$, or HCl. Electrodes 20 and 22, which are of precleaned platinum, are immersed in region 14. These electrodes can be cleaned by heating them to redness with an alcohol lamp, flaming them in a nitrogen atmosphere or by immersing them in boiling HCl. They are then cleaned sufficiently to insure ready adsorption of oxygen when immersed in an air-saturated solution. Electrode 18 is made of gold. The electrode 18 in region 12 and the electrode 20 in region 14 comprise two half cells of the primary cell.

This electrode system acts ideally as a primary electrochemical cell, it delivers a current spontaneously without any applied E.M.F. as described above. In the preferred apparatus illustrated, the cell is capable of acting as a primary cell and the output is made to depend upon the state of oxygen-polarization of the electrode 20 and on the $Fe^{++}/Fe^{+++}$ ratio in region 12. As set forth above, the platinum electrodes 20 and 22 are precleaned.

It is theorized, to go into the finer details, that this treatment activates the electrodes 20 and 22 by removing chemisorbed $O_2$ or OH therefrom. The electrode physically adsorbs dissolved oxygen when it is immersed in an air saturated solution, and functions as an oxygen electrode, catalyzing the reduction of $O_2$ to $H_2O$. It is to be recalled that in the illustrated cell without irradiation or applied E.M.F. that the current will decay with time, as would any primary cell. The decay of current is due to the gradual transition of the oxygen from a physically adsorbed state to the chemisorbed condition, thereby making the transfer of electrons to contribute to the reduction which is taking place at electrode 20 impractical thus slowing up the current.

The two half cells which are coupled to function as a primary cell are a ferrous-ferric half cell and an adsorbed $O_2$—$H_2O$ half cell. Since these cells coupled to give the best results, gold is used as an anode, electrode 18, as it does not adsorb oxygen in the same way that platinum does and thereby makes the cells more distinct and sensitive to change in the $Fe^{++}/Fe^{+++}$ ratio as it is more capable of adsorbing electrons.

The third electrode 22 is inserted in region 14 to maintain electrode 20 in its oxygen adsorbed state. This is accomplished by regulating the potentiometer 28 so that an electrolytic effect is created which keeps adsorbed $O_2$ on electrode 20 in its physically adsorbed state. The $O_2$ on the electrode 20 is generated apparently at the expense of the chemisorbed species. In operation of this dosimeter the oxygen on electrode 20 is generated at such a rate as to exactly equal the rate at which it would become inactivated. Thus, it is clearly seen that if electrode 20 is maintained in a constant state the cell current output will depend only upon the ferrous-ferric ratio in the other half cell.

Figure 2:
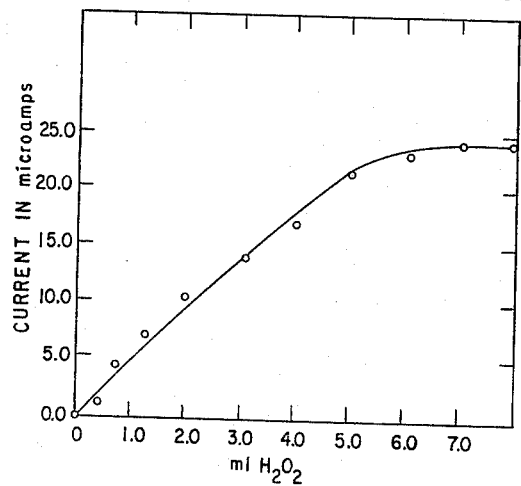
FIGURE 2 is a diagram of the effect of $H_2O_2$ on a ferrous-ferric solution and its effect on current.

It is well known as set forth hereinabove, that irradiation has a linear effect on the oxidation of ferrous to ferric. The dependence of the cell output on the ferrous-ferric ratio is shown in FIGURE 2, where the cell current is plotted as a function of the volume of $H_2O_2$ added to the ferrous sulfate solution to oxidize it. The equivalence point in this reaction corresponds to the addition of 6.0 ml. of $H_2O_2$ to the $H_2SO_4$-$FeSO_4$ solution in region 12.

In operation, irradiation of total doses of from 50 r. to 1,000,000 r. and dose rates from 10 r./hr. to 10,000,000 r./hr. have been detected. Irradiation of the ferrous sulfate solution will cause oxidation, as indicated herein, of the ferrous ions to ferric ions. The ratio of ferrous to ferric ions therefore is upset and an E.M.F. will result which can be measured by meter 31. Meter 31 is preferably a galvanometer but any meter capable of measuring current may be substituted. In operation of the dosimeter, this meter is brought to a standard reading by adjustment of potentiometer 28 or adjustment of both potentiometers 28 and 30 until it has a constant reading which indicates that the oxidation which is taking place in region 12 is counterbalanced by the amount of activity at electrode 20. Electrode 22 maintains this balance by adjusting potentiometer 28 so that the amount of $O_2$ reduced at electrode 20 can be regenerated by the current that passes from electrode 22. Thus, it is seen that the system can be stabilized by the proper adjustments of the potentiometers.

Upon irradiation, there is an increased rate of oxidation of ferrous to ferric ions and a subsequent increase in current reading on the meter. Measurements may be made by another method. This method is referred to as a "null balance means." This method involves, during irradiation, adjusting the meter 31 reading to zero by use of potentiometer 30 and taking a reading from the potentiometer 30.

The apparatus is stable and can be in operation for a long period of time as the ferrous sulfate solution can be regenerated. Potentiometer 30 or 29 can be regulated, during irradiation or after irradiation, thereby causing a reduction to take place at electrode 18, ferric ions ($Fe^{+++}$) being reduced to ferrous ions ($Fe^{++}$). The equation to illustrate this is:

$$Fe^{+++} + 1e \longrightarrow Fe^{++}$$

As the apparatus is constructed, it will measure all radiations capable of producing chemical changes, viz., oxidation of ferrous to ferric or the reduction of ceric to cerrous in a dosimetric solution. It is also suitable to measure $\alpha$, $\beta$, $\gamma$, X- and cosmic radiations of all energies.

We claim:

A dosimeter comprising
(a) a primary cell
(b) a porous frit dividing the cell into a first part and a second part; said first part containing a $10^{-3}$ molar solution of ferrous sulfate in 0.8N sulfuric acid solution and said second part containing a 0.8N solution of sulfuric acid;
(c) a gold anode immersed in the solution contained in the first part,
(d) a platinum anode immersed in the solution contained in the second part,
(e) external electrical circuit means connecting said anode to said cathode,
(f) electrical current measuring means operatively connected to the external circuit means for measuring the flow of current through the circuit means,
(g) a platinum electrode immersed in the solution contained in the second part,
(h) a current generating battery having a positive pole and a negative pole,
(i) the negative pole being grounded,
(j) a potentiometer being connected across the poles of the battery,
(k) a wiper on said potentiometer, said wiper being operatively connected with said electrode, the potentiometer being capable of regulating the flow of current from the battery to said electrode, so as to permit the electrode to repolarize the cathode as fast as it is depolarized upon exposure of the solution in the first part of said cell to irradiation.

(References on following page)

References Cited by the Examiner

UNITED STATES PATENTS

| | | | |
|---|---|---|---|
| 1,870,995 | 8/32 | Greer | 204—195 |
| 1,944,804 | 1/34 | Orstein | 204—195 |
| 2,071,697 | 2/37 | Larrabee | 204—195 |
| 2,323,484 | 7/43 | Neufeld | 204—195 |
| 2,414,411 | 1/47 | Marks | 204—1.1 |
| 2,650,256 | 8/53 | Lingane | 204—195 |
| 2,651,612 | 9/53 | Haller | 204—195 |
| 2,697,673 | 12/54 | Rice | 204—195 |
| 2,758,079 | 8/56 | Eckfeldt | 204—195 |
| 2,805,191 | 9/57 | Hersch | 204—195 |
| 2,832,734 | 4/58 | Eckfeldt | 204—195 |
| 2,870,067 | 1/59 | Baker et al. | 204—1 |
| 2,886,496 | 5/59 | Eckfeldt | 204—195 |
| 2,898,282 | 8/59 | Flook et al. | 24—195 |
| 2,927,888 | 3/60 | Beard | 204—195 |
| 2,939,827 | 6/60 | Jacobson et al. | 204—195 |
| 3,022,241 | 2/62 | Jessop | 204—195 |
| 3,030,510 | 4/62 | Reeder | 250—83.3 |
| 3,050,371 | 8/62 | Dowson et al. | 204—195 |

WINSTON A. DOUGLAS, *Primary Examiner.*

JOHN R. SPECK, MURRAY TILLMAN, JOHN H. MACK, *Examiners.*